UNITED STATES PATENT OFFICE.

EDGAR A. BALDWIN, OF PHELPS COUNTY, AND CLIFFORD A. HOLCOMBE, OF LINCOLN, NEBRASKA.

IMPROVEMENT IN PROCESSES OF TANNING HIDES.

Specification forming part of Letters Patent No. 164,792, dated June 22, 1875; application filed May 21, 1875.

*To all whom it may concern:*

Be it known that we, E. A. BALDWIN, of Phelps county, Nebraska, and C. A. HOLCOMBE, of Lincoln, in the county of Lancaster and State of Nebraska, have invented certain new and useful Improvements in Tanning Hides; and we do hereby declare that the following is a full, clear, and exact description thereof, which will enable others skilled in the art to which it pertains to make and use the same.

The essence of our invention consists, substantially, of the application or use, in tanning hides, of the plant *Polygonum fluitans*, (Eaton,) in connection with a process hereinafter fully set forth.

Cut and thoroughly cure the said plant about the time it blossoms. To prepare the cured plant for leaching, again cut or comminute it. Place the comminuted plant in a leach, with just sufficient water to cover it; cook to a pulp, after which let it stand four or six hours, when a strong liquor may be drawn off. A liquor of less strength may be obtained by again adding water to the cooked plant or pulp, and allowing it to stand about the same length of time. This second process or treatment of the plant should be repeated until the tanning properties thereof are thoroughly extracted. The liquors thus obtained are ready for the skins or hides to be tanned, their strength being obtained by a barkometer. The skins or hides should be thoroughly limed and baited before immersion. Fresh skins should be placed in liquor, showing about four (4) degrees, constantly handled until the color is set and the grain formed, using the liquor until sour. As the skins or hides begin to "plump," the strength of the liquor should be increased from day to day, and a uniformity of strength of liquor carefully maintained, the skins being constantly handled.

Light skins or hides will be found thoroughly tanned within from twenty to thirty days, heavier ones requiring time in proportion to thickness.

Having thus described our invention, what we claim, and desire to secure by Letters Patent, is—

In tanning hides or skins, the plant *Polygonum fluitans*, (Eaton,) treated in the manner herein described.

In testimony that we claim the foregoing as our own we hereunto affix our signatures in presence of two witnesses.

EDGAR A. BALDWIN.
      CLIFFORD A. HOLCOMBE.

Witnesses:
  A. G. SCOTT,
  I. I. IMHOFF.